United States Patent [19]

Axelsson et al.

[11] Patent Number: 5,344,067

[45] Date of Patent: Sep. 6, 1994

[54] MIXER VALVE REGULATING UNIT, AND A REGULATING UNIT PISTON SLIDE

[75] Inventors: Bo E. K. Axelsson, Blåbärsstigen; Henry E. Krang, Bogghed, both of Sweden

[73] Assignee: FM Mattsson AB, Mora, Sweden

[21] Appl. No.: 81,262

[22] PCT Filed: Jan. 21, 1992

[86] PCT No.: PCT/SE92/00035

§ 371 Date: Jun. 22, 1993

§ 102(e) Date: Jun. 22, 1993

[87] PCT Pub. No.: WO92/14086

PCT Pub. Date: Aug. 20, 1992

[30] Foreign Application Priority Data

Feb. 1, 1991 [SE] Sweden ............... 91 00319

[51] Int. Cl.⁵ ............................... G05D 23/13
[52] U.S. Cl. ............................ 236/12.2; 137/607; 236/12.23
[58] Field of Search ............ 236/12.21, 12.16, 12.2, 236/12.22, 12.23; 137/114, 607

[56] References Cited

U.S. PATENT DOCUMENTS

| | | | |
|---|---|---|---|
| 2,287,810 | 6/1942 | Lund | 137/607 X |
| 2,679,861 | 6/1954 | Campbell | 137/607 |
| 2,800,137 | 7/1957 | Fraser | 137/607 X |
| 3,099,996 | 8/1963 | Symmons | 137/607 X |
| 5,156,187 | 10/1992 | Schmidt et al. | 137/607 |

FOREIGN PATENT DOCUMENTS

| | | |
|---|---|---|
| 2256066 | 5/1973 | Fed. Rep. of Germany . |
| 2839326 | 3/1980 | Fed. Rep. of Germany . |
| 7900697 | 9/1979 | PCT Int'l Appl. . |
| 383404 | 3/1976 | Sweden . |
| 406968 | 3/1979 | Sweden . |
| 407972 | 4/1979 | Sweden . |
| 432649 | 4/1984 | Sweden . |
| 464889 | 6/1991 | Sweden . |

*Primary Examiner*—William E. Tapolcai
*Attorney, Agent, or Firm*—Sughrue, Mion, Zinn, Macpeak and Seas

[57] ABSTRACT

A regulating unit for a hot and cold water mixing valve includes a pressure responsive part having a piston slide 60, and a temperature responsive part which is influenced by a thermostat 45 and which includes a regulating valve body 50 which is axially moveable and optionally included in an insert which can be screwed into the mixing valve. The regulating valve body and the piston slide are mutually concentric and one of these two components is received at least partially in the other.

12 Claims, 4 Drawing Sheets

MIXER VALVE REGULATING UNIT, AND A REGULATING UNIT PISTON SLIDE

BACKGROUND OF THE INVENTION

The present invention relates to a mixer valve regulating unit.

A regulating unit of this kind can be used with different types of mixing valves. The provision in the regulating unit of a pressure responsive component which functions to equalize any difference in pressure that may occur between the hot and the cold water delivered to the regulating unit is a highly important criterion, since a drop in pressure will often occur in practice in one of the delivery pipes as a result, for instance, of the introduction of hot or cold water into a branch pipe connected to the water supply system. A pressure responsive component of this kind will therewith compensate for any differences in pressure that may occur and will ensure that flows of equal magnitude will be delivered to the temperature responsive part of the valve, which is necessary in order to obtain water which has the temperature to which the mixing valve has been set.

The space available in a mixing valve is limited, however, and it is therefore important that a regulating unit which is provided with a pressure equalizing or pressure balancing component has a compact construction.

Furthermore, the regulating unit should preferably have a simple and reliable construction and be capable of being readily serviced, such that the moveable components of the regulating unit can be easily removed from the mixing valve for maintenance purposes or for replacement purposes.

When dimensioning the components of the regulating unit, it must also be remembered that the mixing valve of the kind to which the present invention relates will often require the provision of one or more check valves, or non-return valves, which function to prevent water flowing from at least the hot water side to the cold water side of the system.

SE,B,7403239-2 (Publication No. 383,404) (Vargarda) describes and illustrates a mixing valve which is provided with a temperature controlling knob and which is also pressure controlled, i.e. adapted to equalize variations in pressure of the hot and cold water delivered to the valve. This mixing valve, however, lacks a thermostat part, and the quantity of water delivered is controlled by means of a handle located adjacent a temperature control knob. Consequently, it is not possible to control temperature accurately with this known mixing valve, which lacks the provision of a thermostat control.

SE,B,7409845-0 (Publication No. 406.968) (Pont-a-Mousson) describes and illustrates an insert in the mixer housing formed in a mixing tap. The insert is provided with a temperature control unit and is also intended to function as a flow control valve and has a temperature control knob located adjacent a flow control knob.

The mixing valve insert is rotationally symmetrical about its longitudinal axis and one end of the insert can be screwed into a mixing housing. The insert, however, lacks pressure equalizing means and will function unsatisfactorily in the event of pressure surges in the distribution system.

SE,B,7705979-8 (Publication No. 432,649) (Oras) describes and illustrates an equalizing device intended for mixer valves which is located upstream of the actual mixing valve, seen in the flow direction of the water, and includes a slide which forms adjustable throughflow openings for hot and cold water/respectively, said slide being moved axially in reverse directions to respective water pressures, such as to adjust the areas of the throughflow openings. The slide is connected mechanically to a thermoelement which functions to move the slide in response to water temperature, such as to control the amounts of hot and cold water delivered to the valve.

In this case, the same slide is used both for pressure compensation and temperature control. This would seem impossible to achieve successfully in practice, and in actual fact this construction is a so-called desk invented product which will never function successfully in practice. As with other known mixing valves, the mixing valve taught by this publication has the drawback that the thermostat is located in the region of the temperature control body—it is actually incorporated in the temperature control body in the construction described—which means that the thermostat part will detect a temperature other than the final mixing temperature, which impairs the properties of the mixing valve, i.e. the valve is not as effective as would be desired.

SUMMARY OF THE INVENTION

A primary object of the present invention is to provide a mixing-valve regulating unit which will avoid the aforesaid drawbacks and also other drawbacks of known regulating units and which can be adapted readily to the properties of the distribution system used.

Another object of the invention is to provide a simple insert of small axial length which includes, in one and the same unit, reliable pressure equalizing and thermostat control facilities.

A further object of the invention is to provide a regulating unit of the aforesaid kind whose moveable parts can be easily dismantled and replaced when so required, and which is highly reliable, not least with regard to the possibility of maintaining a preset temperature of the water mixture delivered from the tap.

Because the body of the regulating valve and the piston slide are mutually concentrical and because one of these components is accommodated at least partially in the other, the axial length of the regulating unit is relatively short, thereby enabling the whole of the mixing valve to be given a compact construction.

Despite this compact construction, the thermostat element may be located on one side of both the temperature regulating body and the piston slide, and consequently the thermostat element will detect the temperature of the mixed water, which greatly enhances the precision with which the mixing valve delivers water of a desired temperature.

The moveable parts of the regulating unit may be made of metal or plastic and can be readily dismantled, since piston slide and pressure regulating piston are located one within the other. Thus, both of said components can be replaced with new components should the need arise, without needing to dismantle the components one from the other.

On the other hand, the piston slide can be readily dismantled from the regulating valve body in those instances when it is not necessary to replace both components.

The active part of the thermostat element preferably engages an end surface of the regulating valve body, which applies both when the piston slide is accommodated in the regulating valve body and vice versa.

According to one embodiment, the entire piston slide is accommodated in the regulating valve body and moves together with said body in response to changes in temperature and is moveable relative to said body in response to changes in pressure, such as to equalize the pressure differences.

Thus, in these cases, the regulating valve body can be said to form a housing or casing which surrounds the piston slide and which is provided with port openings for the delivery and discharge of hot and cold water, respectively. Thus, when the valve body is displaced by the thermostat element, the piston slide is also displaced. The relative position between piston slide and valve body, however, is influenced solely in connection with occurrent differences in pressure of the hot and cold water, since the piston slide is displaced within the valve body to equalize such pressure differences.

In the case of this embodiment, it is preferred that the piston slide has two peripheral, central first sealing sur-faces which, depending on the position of the piston slide, cover varying areas of corresponding port openings in the valve body for the inflow and outflow of hot and cold water into and out of the interior of the valve body, in which the slide is moveable.

The water pressure is therewith able to act on the open ends of the piston slide via holes in parts of the piston slide, e.g. sleeve-shaped parts, located between said sealing surfaces.

The regulating valve body will also preferably include a central throttling flange which projects into a fixed sleeve surrounding a port opening and preferably comprising several parts, said valve body being moveable in relation to said sleeve. The throttle flange is intended to control the flows of hot and cold water which are delivered to respective port openings on different sides of the throttling flange subsequent to pressure equalization in the piston slide, depending on the temperature desired.

In this embodiment, it is also preferred that the valve body is provided on each side of the throttling flange with two further flanges whose diameters are smaller than the diameter of the throttling flange and which are provided with respective O-rings. The flanges, together with the sleeve, define inlet and outlet chambers for hot and cold water/respectively, said chambers having radial port openings whose effective areas are increased and decreased, respectively, with commensurate movement of the piston slide.

A particularly simple construction is obtained when, in accordance with a preferred embodiment, the regulating valve body is comprised of two parts which are screw-threaded in the region of the throttling flange and which are screwed together to form a unit subsequent to insertion of the piston slide. Alternatively, the body parts may be joined together by means of snap-on connection. Thus, the whole of this assembly can be replaced if necessary, or the valve body can be dismantled from the assembly and replaced, while retaining the other of said two elements.

In the case of a variant to this embodiment, the valve body is accommodated at least partially in the piston slide, wherein the valve body and/or the piston slide have a central, peripheral seal which defines hot and cold water chambers between the valve body and the piston slide.

This alternative main embodiment of the inventive regulating unit will also have the desired compact form. None of the two main components of the unit need have a large diameter in order to function effectively, thereby enabling a reduction in the radial dimensions of said unit. In practice, it is preferred that radial port openings in the piston slide of this embodiment coact with radial port openings in a surrounding sleeve, such as to adjust the effective port area and to balance the pressure of the incoming hot and cold water.

In addition, it is preferred that the end surfaces the valve body control the flow of hot and cold water, respectively, in coaction with vertical, stationary sealing surfaces, in accordance with the desired temperature.

Irrespective of which of these main embodiments is chosen, an inventive regulating unit may either be mounted more or less permanently in a mixing valve or may have the form of an insert which can be screwed into a mixing valve and which is provided with a temperature setting knob.

This insert may optionally be exchangeable for other types of inserts, for instance an insert provided with solely temperature control means or an insert provided with solely pressure control means- The type of insert selected in different circumstances will therewith depend on the properties of the water delivery system used.

The invention also relates to a piston slide of a regulating unit of the aforesaid kind.

A piston slide of this kind is particularly advantageous in the event of a drop in pressure in the cold water delivery pipe, since the slide will prevent hot water from flowing to the cold water side of the regulating unit, an occurrence which could well result in serious scalding.

One embodiment of the slide provides the separate advantage that the resilient, mutually connected parts of the piston slide are able to move slightly in relation to one another, thereby obviating the risk of the slide binding or catching in a surrounding element, for example in a valve body.

The invention will now be described in more detail with reference to a number of exemplifying embodiments thereof, and also with reference to the accompanying drawings.

BRIEF DESCRIPTION OF THE DRAWINGS

Finally.

DESCRIPTION OF PREFERRED EMBODIMENTS

Figure 1:
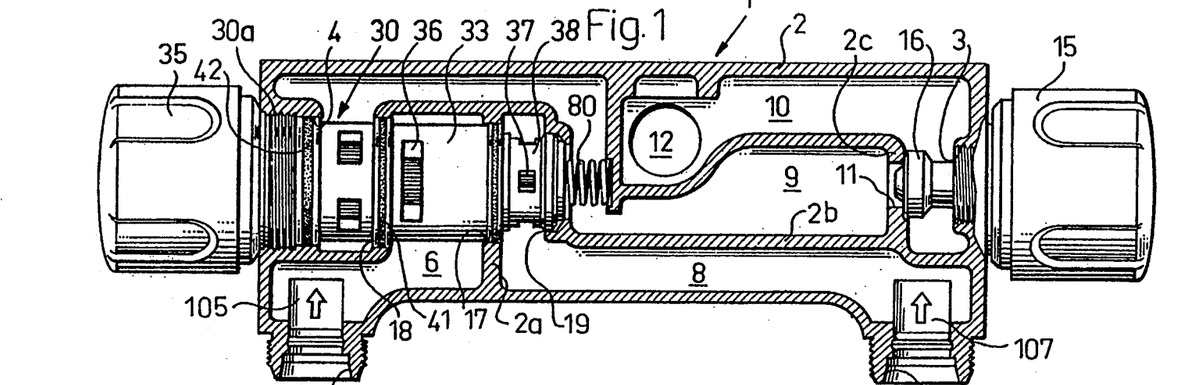
FIG. 1 is a cross-sectional view of a mixing valve housing provided with a flow regulating knob. The valve is provided with an inventive regulating unit accommodated in an insert which is screwed into the end of the valve housing opposite to the flow regulating knob.

FIG. 1 is a cross-sectional view of a mixing valve 1 which includes a valve housing 2 having screw-threaded openings 3 and 4 provided at respective ends thereof.

Screwed into the opening 3 is a flow regulating or control knob 15 which is connected with an outlet-valve body 16 which functions to regulate or control the flow of water delivered from the mixing valve through an outlet opening 12.

Screwed into the other opening 4 of the valve housing 2 is an insert 30 which is provided with a temperature regulating or control knob 35 and which accommodates a regulating unit, of which different embodiments thereof are described in more detail hereinafter.

The valve housing 2 is also provided with a screw threaded connection which includes a cold-water inlet opening 5 and a screw threaded connection which includes a hot-water inlet opening 7. Check valves, or non-return valves, 105, 107 are connected to respective openings.

Each of the inlet openings 5 and 7 is connected to a respective cold-water inlet chamber 6 and hot-water inlet chamber 8, these chambers being mutually separated by means of a first partition wall 2a.

The valve housing also includes a second partition wall 2b which separates the hot-water inlet chamber 8 from a mixing chamber 9 located on the other side of the partition wall.

The valve housing 2 also includes a third partition wall 2c which is provided with a seating 11 for the body 16 of the outlet valve. This third partition wall 2c separates the mixing chamber 9 from the outlet chamber 10, which communicates with the outlet opening 12 of the mixing valve. The first and second partition walls 2a, 2b include respective openings 17 and 19.

The insert 30 screwed into the end opening 4 of the housing is provided with a temperature control knob 35. The front end of the insert 30 is received in the opening 19 and sealed by an O-ring 32'. Another part of the insert is received in the opening 17 and is sealed by an 0-ring 32. Further parts of the insert are received in respective openings 18 and 4, said parts being provided with respective O-rings 41 and 41". The chambers 6 and 8 for cold and hot water respectively are, in this way, mutually sealed from one another and also from the mixed water chamber 9.

The internal regulating unit of the insert illustrated in FIG. 2 will now be described in more detail with reference to FIGS. 2-5.

The regulating unit includes two mutually concentrical parts, namely a temperature responsive part which comprises generally a thermostat element 45 and a temperature regulating body 50 (shown in FIG. 3) together with an associated, moveable pin 46, and a temperature responsive part comprised essentially of a piston slide 60 (shown in FIG. 5) which is accommodated in the temperature regulating body 50 for axial movement therein.

Figure 2:
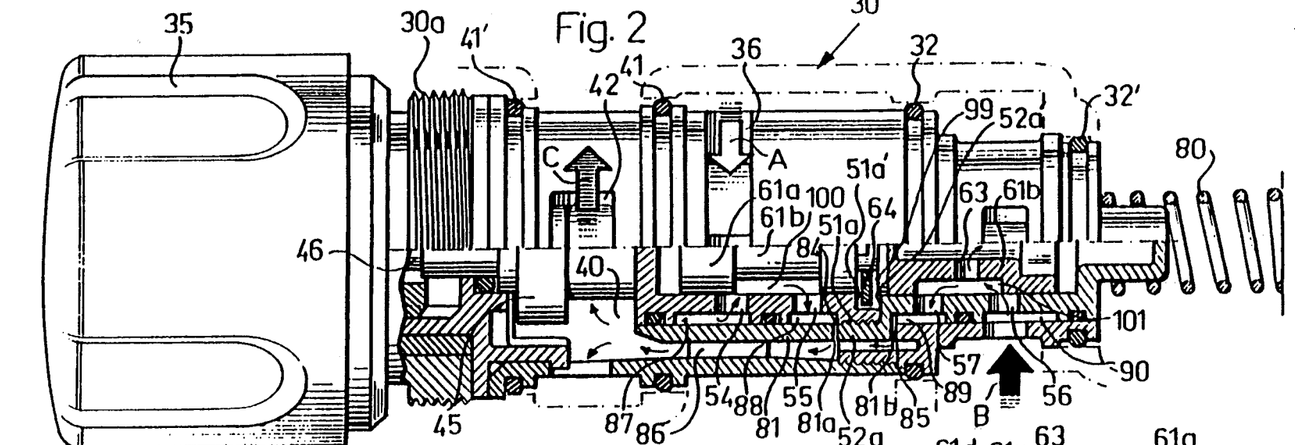
FIG. 2 is a partially cut-away side view of the insert shown in FIG. 1, having a regulating unit constructed in accordance with a first embodiment of the invention.

When the thermostat element 45 is heated, the element will expand so as to cause the pin 46 to move, so that the thermostat element 45 displaces the temperature regulating body 50 to the right in FIG. 2, against the action of a return spring 80. The piston slide 60 accompanies this movement, and also the return movement of the valve body to the left in FIG. 2 under the action of the spring 80, when the thermostat element 45 contracts as the temperature in the surrounding mixing chamber 40 drops.

The piston slide 60, in turn, is able to move axially in both directions relative to the surrounding temperature regulating body 50 in response to occurring differences in the pressure of the hot water and cold water delivered. The manner in which this is achieved is described in more detail herebelow. However, the construction of the temperature regulating body 50 and the piston slide 60 will be described first, with reference to FIG. 3 and to FIGS. 4 and 5, respectively.

Figure 3:
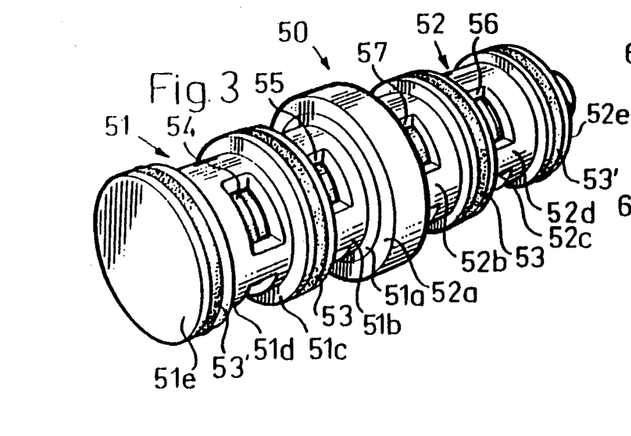
FIG. 3 is a perspective view of a regulating valve body included in the regulating unit.

The temperature regulating body 50 is comprised of a hollow, sleeve-like body comprising two halves 51 and 52 which can be screwed together. The sleeve half 51 has a screw threaded end-flange 51a which coacts with an internal screw thread on a corresponding end-flange 52a on the sleeve half 52. The two sleeve halves 51 and 52 can thus be joined together subsequent to having inserted the piston slide 60.

The end-flange 52a forms a throttling flange on the regulating valve body. The radial parts of this throttling flange, coact with the end surfaces 81a, 81b of a peripheral opening in a surrounding sleeve 81 (c.f. FIG. 2) which consists of two halves which can be screwed together, to determine the widths of two gaps 84, 85 for cold and hot water/respectively, delivered to the space 86 surrounding the sleeve 81 prior to being delivered to the mixing chamber 40, said widths being dependent on the axial position of the valve body 40.

The part 51 of the valve body also includes two axial sleeve-parts 51b and 51d, a flange 51c and an end-flange 51e. Each of the sleeve parts 51d and 51b is provided with a respective port opening 54 and 55 which serves as an inlet and an outlet, respectively, for cold water delivered to and removed from the interior of the regulating valve body 50.

The flanges 51c and 51e are provided with respective O-rings 53 and 53' which are fitted in peripheral grooves and which seal chambers 87, 88 between the valve body 50 and the surrounding sleeve 81.

Correspondingly, the valve body half 52 has axial sleeve parts 52b and 52d, flanges 52c, 52e fitted with O-rings 53 and 53', respectively, and inlet and outlet openings 56 and 57 for hot water to the interior of the right part of the valve body in FIG. 2. Peripheral chambers 89 and 90 are delimited on respective sides of the flange 52c.

As mentioned in the aforegoing, the valve body 50 is moved to the right in FIG. 2 when the thermostat element 45 is heated. This movement of the valve body can also be achieved conventionally, by turning the knob 35 so as to adjust the width of the gaps 84 and 85 accordingly.

Figures 4, 5:
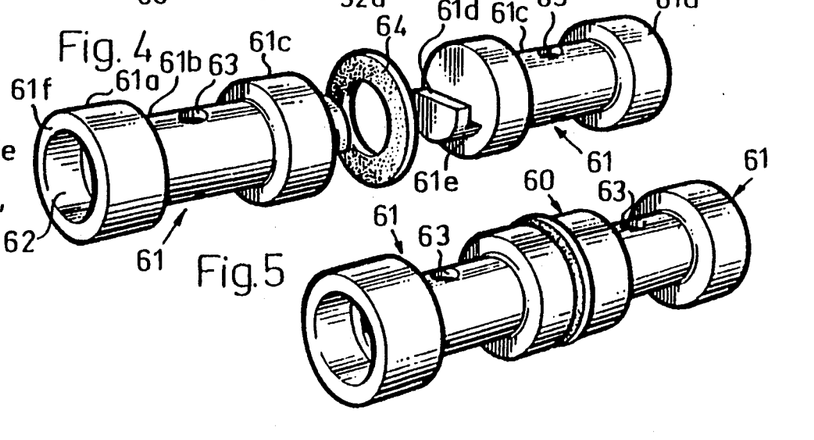
FIG. 4 is an exploded view which includes two mutually identical parts and a sealing ring which together form a pressure-balancing piston-slide which is accommodated in the valve body shown in FIG. 3.
FIG. 5 is a perspective view of an assembled piston slide comprised of the parts shown in FIG. 4.

As will be seen from FIGS. 4 and 5, the piston slide 60 is comprised of two mutually identical parts 61, each provided with two end-flanges 61a, 61c and a central, intermediate sleeve part 61b. The central part 61b has two mutually opposing radial holes 63. The outer end-flanges 61a are open, whereas the mutually facing ends of the end-flanges 61c are closed.

The two parts 61 are held together by outwardly projecting coupling devices which are comprised of axial parts 61e and radial, generally semi-circular parts 61d, these latter parts being able to hook together. In an assembled state, a sealing ring 64 engages over the coupling devices 61d, 61e, the outer diameter of which ring 64 is somewhat larger than the outer diameter of the end-flanges 61c. The sealing ring 64 holds the parts 61 together and also provides a seal between those parts in and externally of the piston slide 60 which receive hot and cold water, respectively. As will be seen from FIG. 2, the piston ring 64 is able to move in a recess 99 provided in the flange 51a, 52a of the valve body.

As indicated by the heavy downwardly pointing arrow A and the upwardly pointing arrow B in FIG. 2, cold water enters through the opening 36 and hot water through the opening 37 into respective chambers 87 and 90, radially inwards of the sleeve element 81 in the interior of the insert 30.

The cold water enters a chamber 100, through the port opening 54, between the flanges 61a and 61c of the piston slide 60 in the interior of the valve body 50.

Hot water enters the chamber 101 in the interior of said valve body 50 in a corresponding manner.

Cold and hot water flow through holes 63 into the interior of the left and the right parts, respectively, of the piston slide 60 and therewith act on the annular end surface 61f of respective end-flanges 61a, via respective end-openings 62.

If the pressure in the hot water inlet 37 drops, the piston slide 60 of the FIG. 2 illustration will be moved to the right, therewith widening the port opening 56 in the valve body and balancing the pressure difference.

If, instead, the cold water pressure drops, the piston slide 60 will be moved to the left, resulting in a corresponding balance of the pressure difference.

The flow of hot and cold water of equal pressures will therefore be delivered to the chambers 88 and 89 on opposite sides of the throttling flange 51a, 52a. Consequently, the quantities of cold and hot water that pass through the gaps 84 and 85 on both sides of the throttling flange 51a, 52a will only be dependent on water temperature and the setting of the knob 35.

Mixed water is supplied to the mixing chamber 40, which accommodates the thermostat element 45, via the circular space 86 surrounding the sleeve 81. In this case, the valve body 50 is controlled accurately by the thermostat element, since hot and cold water have already been inter-mixed thoroughly in this position of the mixing chamber. The mixed water departing through the opening 42, in the direction of the arrow C, will therefore have precisely the temperature desired.

Figure 6:
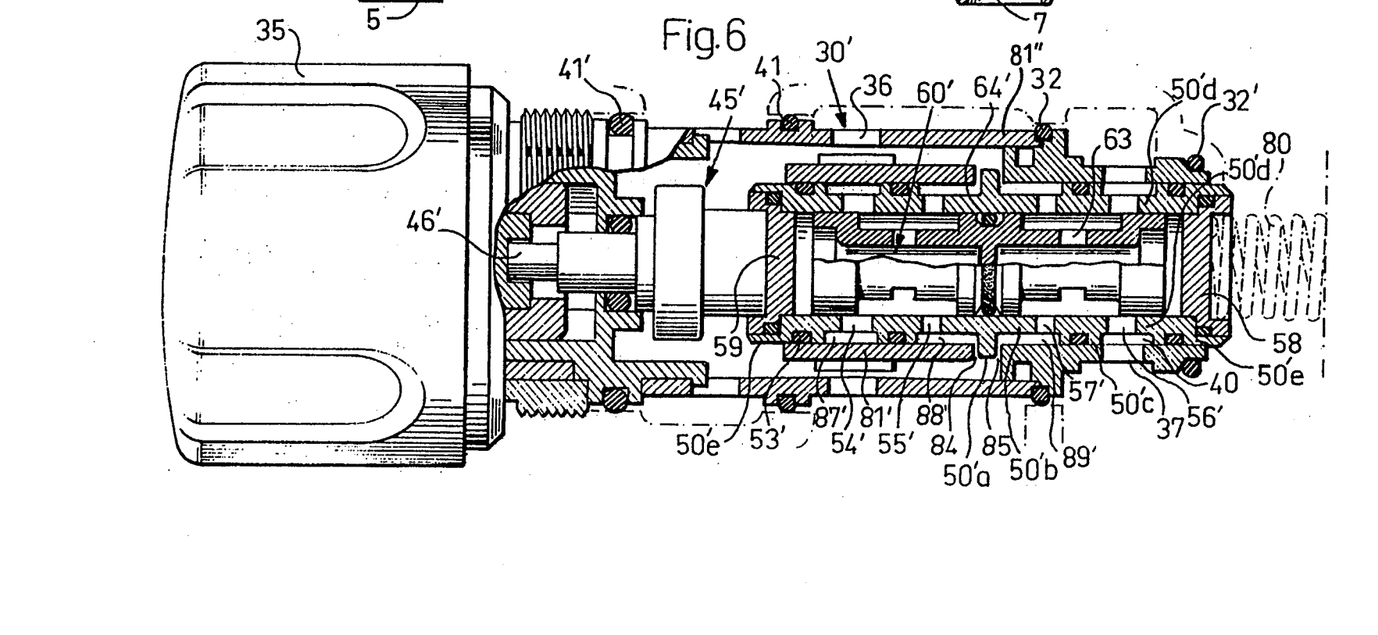
FIG. 6 is a partially cut-away side view of an insert which is similar to the insert shown in FIG. 2 but which has a slightly modified valve body.
Figure 7:
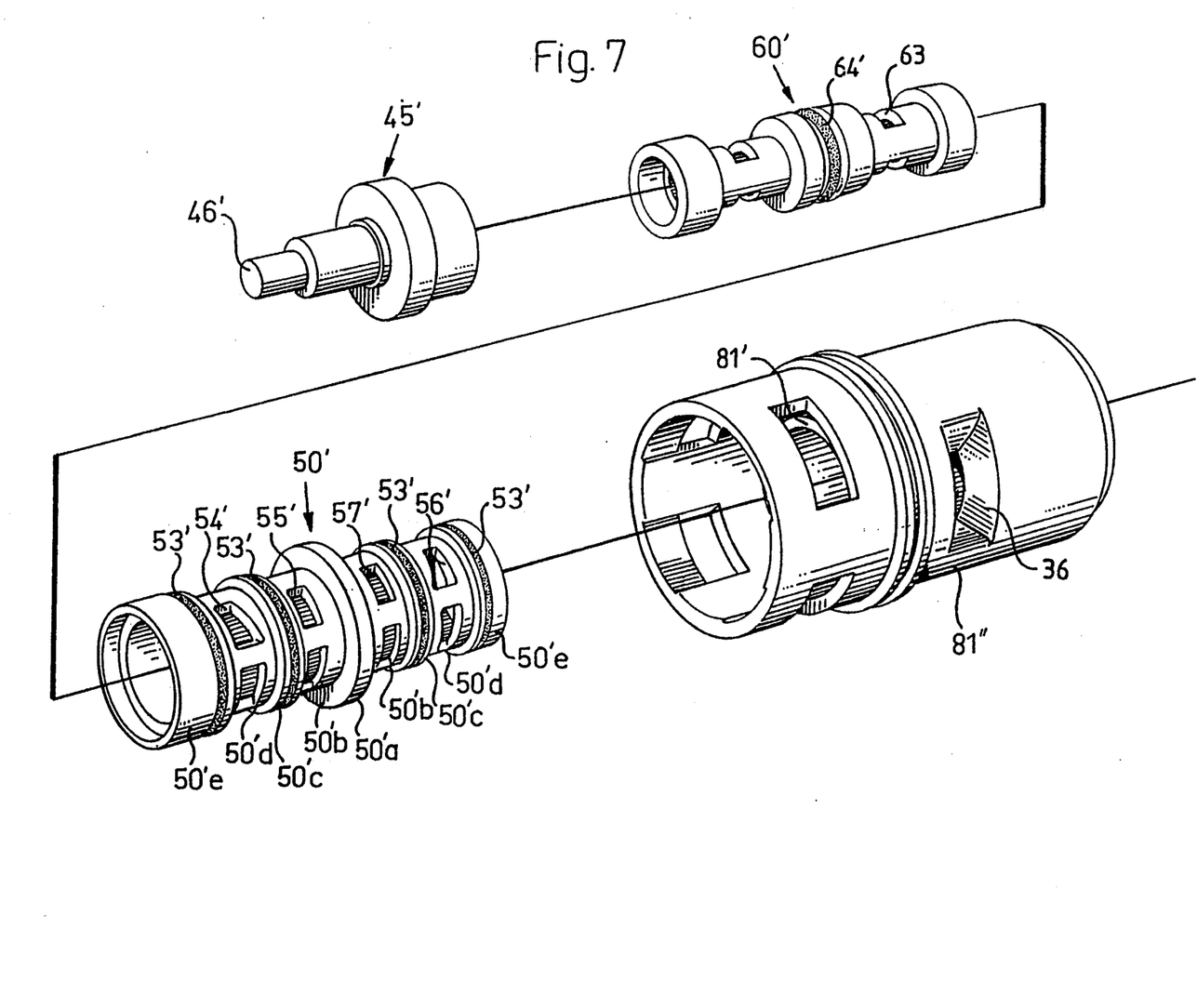
FIG. 7 is an exploded view which illustrates the components of the FIG. 6 insert included in the regulating unit, said Figure also showing the coacting thermostat element.

FIGS. 6 and 7 illustrate an embodiment which, with regard to construction and method of operation, is similar to the aforedescribed embodiment, but which differs slightly with regard to its structural design.

The piston slide 60' of this embodiment is a single-piece structure and is provided with a central O-ring 64'. The temperature regulating body 50' is comprised of a single, integral part which is opened at both ends thereof, so as to enable the piston slide 60' to be inserted into said body. Subsequent to inserting the slide, the ends of the body are closed by means of respective end-plates 58 and 59, and a thermostat element 45' is arranged in abutment with the end-plate 59.

The sleeve 81 of the aforedescribed embodiment is replaced with a sleeve 81' of slightly different construction, contained in an outer sleeve member 81" which forms a part of the insert 30'. Among other things, the sleeve 81' has a narrower opening for receiving the narrower throttling flange 50'a of the valve body 50'. This opening, in which the gaps 84 and 85 are thus formed, is located in a region where the diameter of the sleeve 81' decreases abruptly.

The manner of operation of this embodiment is similar to that described above with reference to the embodiment illustrated in FIGS. 2-5.

Figure 8:
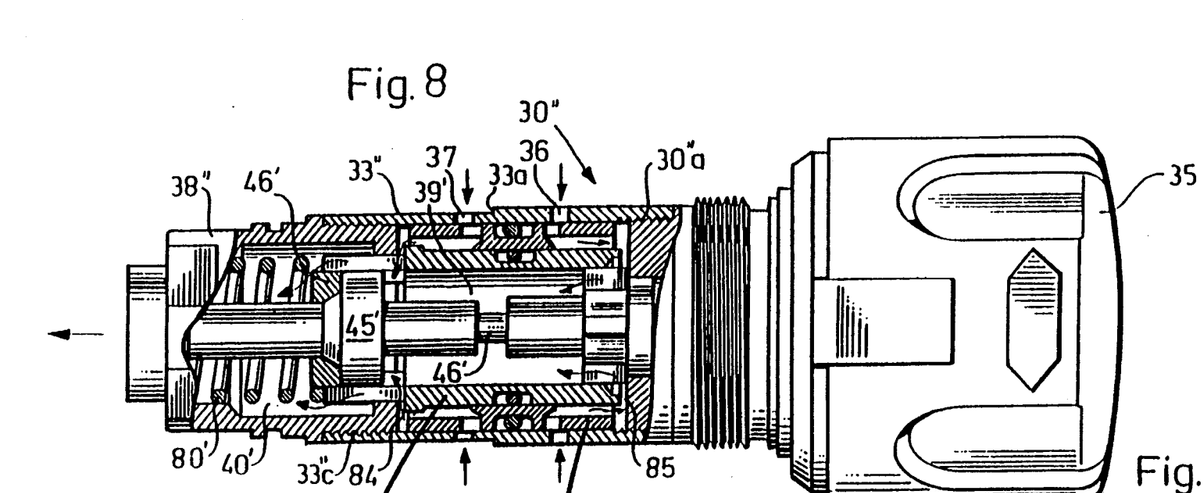
FIG. 8 is a partially cut-away view from above of an insert provided with an alternative inventive regulating unit, in which the valve body is accommodated in the piston slide.
Figure 9:
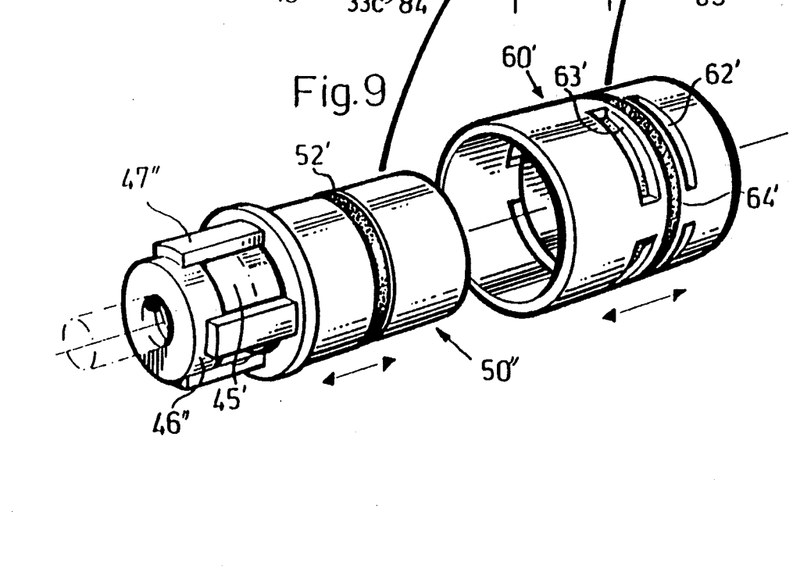
FIG. 9 is an exploded view of the regulating body, with thermostat element, and the piston slide of the unit illustrated in FIG. 8.
Figure 10:
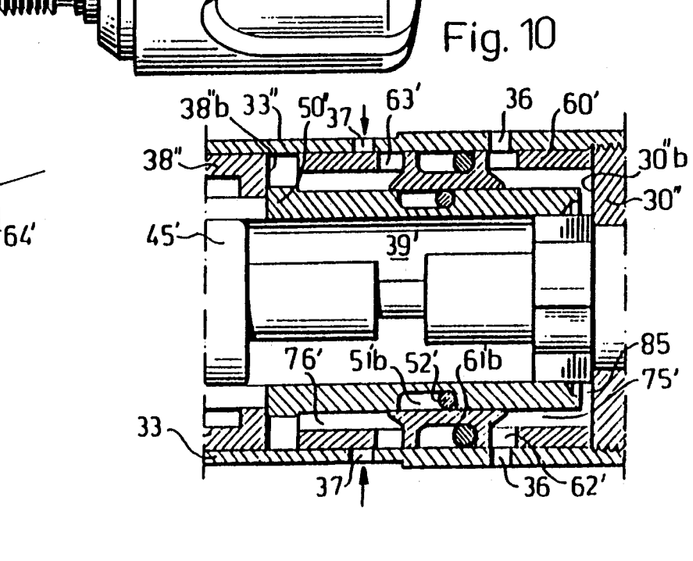
FIG. 10 illustrates in larger scale the central part of the regulating unit in the insert shown in FIG. 8.

The embodiment illustrated in FIGS. 8-10 differs mainly from the aforedescribed embodiments in that the temperature regulating body 50" is arranged concentrically in the pressure regulating or control element 60", in the form of a sleeve which is open at both ends thereof. The temperature regulating body 50" is moveable between two end positions in the sleeve 60'. As with the aforedescribed embodiments, movement of the regulating body between these two end positions is controlled by a thermostat element 45', which expands when heated and therewith moves a transfer element 46' to the left.

This movement takes places against the action of a return spring 80' which is held between a shoulder on a hot water seat 38" in the left end of the insert 30" and an end edge of an axial strip element 47" which joins the transfer element 46' to the regulating body 50".

The position of the thermostat element 45' is set in a conventional manner by means of a temperature control knob 35. The thermostat element is therewith activated from the control knob 35, through the medium of known elements.

The valve is regulated to a desired temperature by moving the temperature regulating body 50" to the right or to the left, in the aforedescribed manner, so as to reduce the area of an appropriate gap 84, 85.

FIG. 10 illustrates in larger scale the temperature regulating body 50" surrounded by the outer sleeve 33" and having a groove 51'b for receiving an O-ring 52'. The operational function of the pressure responsive part, i.e. the sleeve 60', corresponds to the aforedescribed embodiments and thus balances or equalizes the pressure in the event of pressure differences of hot and cold water, respectively.

As before mentioned, the outer diameter of the regulating body 50" is smaller than the diameter of the regulating body of the earlier described embodiments, but operates correspondingly in coaction with the thermostat element 45 as with the aforedescribed embodiment. The regulating body 50" is moveably accommodated in the surrounding pressure control piston 60' having parts whose outer diameters correspond to the inner diameter of the surrounding sleeve 33", such that the piston 60' is moveable in the sleeve 33" under the action of different pressures in the cold and hot water inlets 36 and 37 respectively, said pressures acting on the end surfaces of the piston 60'.

The piston 60' also has slot-like inlet openings 62', 63' on both sides of a central sealing part 61'b shown in FIG. 10.

Formed between the pressure control piston 60' and the temperature regulating body 50" are spaces 75', 76' through which cold water and hot water respectively are delivered to the inner spaces 39' and 40' of the insert.

The regulating unit of this embodiment also has a short axial length, since the temperature responsive part is mounted concentrically in the pressure responsive part.

In all of the aforedescribed embodiments, the regulating unit is comprised of an insert which can be screwed into one end of a mixing valve. The insert may be replaceably mounted so as to enable it to be replaced with another insert of simpler construction, e.g. an insert which includes solely a temperature responsive part or solely a pressure responsive part. A simpler insert of this kind may find use in those instances when the properties of the distribution system are comparatively constant, in which case an inventive insert may find appropriate use when more tap points are installed in the system, after the system has been in operation for some time, and therewith increasing the risk of, e.g., pressure variations in the system.

It is emphasized, however, that the inventive regulating unit need not be included in an insert of the aforedescribed kind. The concept of the invention can be equally as well applied in other types of mixing valves in which the regulating unit is a more or less permanent fixture.

The piston slide 60 illustrated in FIG. 5 and comprising two mutually identical slide halves 61 (FIG. 4) which are held together by mutually engaging coupling devices 61e, 61d in coaction with the sealing ring 64 is particularly suitable because of the possibility of the two slide halves 61 to move relative to one another. This possibility fully eliminates the risk of the piston slide jamming or binding in the surrounding regulating valve body 50.

In the event of a drop in pressure in, for instance, the cold water inlet 36 in FIG. 2, the piston slide 60 will be moved left in this Figure. Although the hot water inlet 56 will then be closed, there is nevertheless a danger that hot water will still leak into the cold water side via the peripheral sealing surface 61c, and therewith present a scalding risk.

This risk is eliminated, however, by the sealing ring 64, which moves into abutment with the surface 51a' in the valve body when the piston slide 60 is moved to the left. This effectively prevents the ingress of hot water into the cold water side of the system.

The ingress of cold water into the hot water side of the system is prevented in a corresponding manner in the event of a drop in pressure on the hot water side, in which case the piston slide is moved to the right in FIG. 2.

The sealing ring 64 thus has the dual purpose of holding the assembled parts 61 of the piston slide together, with the possibility of slight relative movement of said parts, and of preventing undesirable leakage of water in coaction with a peripheral sealing surface 51a' 52a', respectively, in the aforedescribed manner.

We claim:

1. A regulating unit for hot and cold water mixing valves, comprising:
   a) a pressure responsive part having an axially movable piston slide (60; 60') which functions to equalize pressure differences occurring between the hot and cold water delivered thereto, such that hot and cold water flows of essentially the same pressure exit from said pressure responsive part, and
   b) a temperature responsive part which is activated by a thermostat element (45; 45') and which includes an axially movable regulating valve body (50; 50'; 50") which is displaced in accordance with the temperature of the mixed water, wherein:
   c) the regulating valve body and the piston slide are mutually concentric, and one of these components is accommodated at least partially in the other,
   d) at least a major part of the thermostat element is located in a mixing chamber (40; 40') axially on one side of the regulating valve body concentric with the piston slide, and
   e) the thermostat element or a part coacting with said element engages an end surface of the valve body.

2. A regulating unit according to claim 1, wherein the valve body is accommodated at least partially in the piston slide.

3. A regulating unit according to claim 2, wherein the piston slide includes radial port openings (62', 63') which coact with radial port openings (37, 36) in a surrounding sleeve (33A) in a manner to obtain an effective port area and to balance the pressure of the incoming hot and cold water.

4. A regulating unit according to claim 2, wherein the ends of the valve body coact with peripheral, fixed sealing surfaces (30"b, 38"a) in a manner to regulate the flow of hot and cold water.

5. A regulating unit for hot and cold water mixing valves, comprising:
   a) a pressure responsive part having an axially movable piston slide (60; 60') which functions to equalize pressure differences occurring between the hot and cold water delivered thereto, such that hot and cold water flows of essentially the same pressure exit from said pressure responsive part, and
   b) a temperature responsive part which is activated by a thermostat element (45; 45') and which includes an axially movable regulating valve body (50; 50'; 50") which is displaced in accordance with the temperature of the mixed water, wherein:
   c) the regulating valve body and the piston slide are mutually concentric, and one of these components is accommodated at least partially in the other,
   d) the whole of the piston slide is located in the valve body and moves together with said valve body in response to changes in temperature and in the event of a pressure difference moves in relation to said body so as to equalize said pressure differences, and
   e) the piston slide has first peripheral sealing surfaces (61c) and a second peripheral sealing surface (61a) located at each end, said sealing surfaces, depending on the axial position of the piston slide, covering varying areas of corresponding port openings (54-57; 54'-57') in the valve body for supplying hot and cold water to and discharging hot and cold water from the interior of the regulating valve body in which the piston slide is movable.

6. A regulating unit according to claim 5, wherein the water pressure acts on open ends of the piston slide through holes located between first and second sealing surfaces (61a, 61c) in sleeve-like parts (61b) of the piston slide.

7. A regulating unit for hot and cold water mixing valves, comprising:

a) a pressure responsive part having an axially movable piston slide (60; 60') which functions to equalize pressure differences occurring between the hot and cold water delivered thereto, such that hot and cold water flows of essentially the same pressure exit from said pressure responsive part, and b) a temperature responsive part which is activated by a thermostat element (45; 45') and which includes an axially movable regulating valve body (50; 50'; 50") which is displaced in accordance with the temperature of the mixed water, wherein:

c) the regulating valve body and the piston slide are mutually concentric, and one of these components is accommodated at least partially in the other, d) the whole of the piston slide is located in the valve body and moves together with said valve body in response to changes in temperature and in the event of a pressure difference moves in relation to said body so as to equalize said pressure differences, e) the regulating valve body includes a central throttling flange (52a, 52'a) which projects into a port opening in a fixed sleeve (81; 81') which surrounds said port opening and relative to which the valve body is movable, and f) the throttling flange is intended to regulate the flows of hot and cold water in accordance with the desired temperature, said flows being delivered to respective port openings on different sides of the throttling flange subsequent to equalizing the pressures of said flows.

8. A regulating unit according to claim 7, wherein the valve body is provided on each side of the throttling flange with respective flanges (51c, 51e, 52c, 52e; 50'c, 50'e) which are provided with O-rings (53; 53') and the diameter of which is smaller than the diameter of the throttling flange; the flanges together with the sleeve define respective hot-water and cold-water inlet and outlet chambers (87, 88, 89, 90; 87', 88', 89', 90'); and the chambers have radial port openings (54, 55, 56, 57; 54', 55', 56', 57') whose areas increase and decrease, respectively, with movement of the piston slide.

9. A regulating unit for hot and cold water mixing valves, comprising:

a) a pressure responsive part having an axially movable piston slide (60; 60') which functions to equalize pressure differences occurring between the hot and cold water delivered thereto, such that hot and cold water flows of essentially the same pressure exit from said pressure responsive part, and b) a temperature responsive part which is activated by a thermostat element (45; 45') and which includes an axially movable regulating valve body (50; 50'; 50") which is displaced in accordance with the temperature of the mixed water, wherein:

c) the regulating valve body and the piston slide are mutually concentric, and one of these components is accommodated at least partially in the other, d) the whole of the piston slide is located in the valve body and moves together with said valve body in response to changes in temperature and in the event of a pressure difference moves in relation to said body so as to equalize said pressure differences, and e) the regulating valve body includes two screw threaded parts (51, 52) in the region of a throttling flange (52a), said parts being screwed together to form a unit subsequent to inserting the piston slide (60).

10. A regulating unit for hot and cold water mixing valves, comprising:

a) a pressure responsive part having an axially movable piston slide (60; 60') which functions to equalize pressure differences occurring between the hot and cold water delivered thereto, such that hot and cold water flows of essentially the same pressure exit from said pressure responsive part, and b) a temperature responsive part which is activated by a thermostat element (45; 45') and which includes an axially movable regulating valve body (50; 50'; 50") which is displaced in accordance with the temperature of the mixed water, wherein:

c) the regulating valve body and the piston slide are mutually concentric, and one of these components is accommodated at least partially in the other, and d) the unit is mounted in an insert (30; 30'; 30") which can be screwed into the mixing valve so as to be readily replaceable and which is provided with a temperature setting knob (35).

11. A regulating unit for hot and cold water mixing valves, comprising:

a) a pressure responsive part having an axially movable piston slide (60; 60') which functions to equalize pressure differences occurring between the hot and cold water delivered thereto, such that hot and cold water flows of essentially the same pressure exit from said pressure responsive part, and b) a temperature responsive part which is activated by a thermostat element (45; 45') and which includes an axially movable regulating valve body (50; 50'; 50") which is displaced in accordance with the temperature of the mixed water, wherein:

c) the regulating valve body and the piston slide are mutually concentric, and one of these components is accommodated at least partially in the other, and d) the slide is provided with two centrally located, peripheral first sealing surfaces (61c) and with a peripheral second sealing surface (61a) located at each end, and a resilient sealing ring (64) mounted between the centrally located first sealing surfaces, the diameter of said sealing ring being larger than the diameter of said central first sealing surfaces, wherein the sealing ring is intended to prevent, in the end positions of the piston slide, hot water from flowing to the cold water side, or vice versa, in the event of a drop in pressure in one of the two peripheral sealing surfaces (51a'; 52a') of an element which coacts with the piston slide.

12. A regulating unit according to claim 11, comprised of two identical parts (61), each having two end-flanges and a central, intermediate sleeve-like part having a radial opening (63), of which end-flanges two outer flanges are open and two adjacent flanges (61c) are closed; wherein the slide parts are held together by outwardly projecting connecting devices which include axial parts (61d) and mutually engaging, generally radially semi-circular parts (61d); and the sealing ring is inserted between said slide parts and holds the connecting devices (61e, 61d) in engagement with one another.

* * * * *